US008834965B2

(12) United States Patent
Mokhtari et al.

(10) Patent No.: US 8,834,965 B2
(45) Date of Patent: *Sep. 16, 2014

(54) ORGANOAMINE STABILIZED SILVER NANOPARTICLES AND PROCESS FOR PRODUCING SAME

(75) Inventors: Mahya Mokhtari, Toronto (CA); Marko D. Saban, Toronto (CA); Roger Earl Gaynor, Oakville (CA)

(73) Assignee: Xerox Corporation, Norwalk, CT (US)

( * ) Notice: Subject to any disclaimer, the term of this patent is extended or adjusted under 35 U.S.C. 154(b) by 697 days.

This patent is subject to a terminal disclaimer.

(21) Appl. No.: 12/369,861

(22) Filed: Feb. 12, 2009

(65) Prior Publication Data

US 2010/0203333 A1   Aug. 12, 2010

(51) Int. Cl.
  *B05D 5/12*   (2006.01)
  *C09D 11/02*   (2014.01)
  *B82Y 40/00*   (2011.01)
  *B82Y 10/00*   (2011.01)
  *B82Y 30/00*   (2011.01)
  *B22F 1/00*   (2006.01)
  *B22F 9/24*   (2006.01)

(52) U.S. Cl.
  CPC ........... *B22F 9/24* (2013.01); *B22F 1/0018* (2013.01); *B82Y 30/00* (2013.01); *Y10S 977/773* (2013.01); *Y10S 977/932* (2013.01)
  USPC ........... 427/216; 427/212; 427/215; 427/220; 427/58; 427/96.1; 427/98.4; 977/773; 977/932; 106/31.13; 106/31.65; 106/31.01; 106/31.92

(58) Field of Classification Search
  None
  See application file for complete search history.

(56) References Cited

U.S. PATENT DOCUMENTS

| 4,403,072 | A  | * | 9/1983 | Bunes ........................... 525/353 |
| 6,348,295 | B1 |   | 2/2002 | Griffith et al. |
| 6,621,099 | B2 |   | 9/2003 | Ong et al. |
| 6,770,904 | B2 |   | 8/2004 | Ong et al. |
| 6,949,762 | B2 |   | 9/2005 | Ong et al. |
| 7,160,525 | B1 |   | 1/2007 | Peng et al. |
| 7,270,694 | B2 |   | 9/2007 | Li et al. |
| 7,306,969 | B2 |   | 12/2007 | Wu et al. |
| 2003/0136943 | A1 | * | 7/2003 | Alivisatos et al. ....... 252/299.01 |

(Continued)

FOREIGN PATENT DOCUMENTS

| CA | 2 649 513 | 4/2007 |
| EP | 1646095 A2 | 4/2006 |

(Continued)

OTHER PUBLICATIONS

Yamamoto et al., "Novel Preparation of Monodispersed Silver NanoparticlesVia Amine Adducts Derived from Insoluble Silver Myristate in Tertiary Alkylamine", J. Mater. Chem., 2003, 13, 2064-2065.

(Continued)

*Primary Examiner* — Michael Cleveland
*Assistant Examiner* — Lisha Jiang
(74) *Attorney, Agent, or Firm* — Fay Sharpe LLP

(57) ABSTRACT

Processes for producing organoamine-stabilized silver nanoparticles are disclosed. The processes comprise: (a) forming a solution comprising an organic solvent and a first amount of organoamine; (b) adding silver salt particles to the solution; (c) adding a second amount of organoamine to the solution; (d) adding an organohydrazine to the solution; and (e) reacting the solution to form organoamine-stabilized silver nanoparticles.

13 Claims, 4 Drawing Sheets

(56) References Cited

U.S. PATENT DOCUMENTS

| | | |
|---|---|---|
| 2005/0129843 A1 | 6/2005 | Wu et al. |
| 2005/0139144 A1* | 6/2005 | Muller et al. .................. 117/2 |
| 2006/0073667 A1* | 4/2006 | Li et al. .................. 438/311 |
| 2007/0099357 A1 | 5/2007 | Li et al. |
| 2007/0190323 A1* | 8/2007 | Lee et al. .................. 428/402 |
| 2008/0000382 A1 | 1/2008 | Li et al. |
| 2008/0085594 A1 | 4/2008 | Li et al. |
| 2009/0029148 A1* | 1/2009 | Hashimoto et al. .......... 428/323 |
| 2009/0295005 A1* | 12/2009 | Rauscher et al. ............... 264/5 |
| 2009/0305247 A1* | 12/2009 | Gao .............................. 435/6 |

FOREIGN PATENT DOCUMENTS

| | | |
|---|---|---|
| EP | 1916671 A2 | 4/2008 |
| JP | 2006219693 | 8/2006 |
| WO | WO 2007034922 A1 * | 3/2007 |
| WO | WO2007/120756 A3 | 10/2007 |
| WO | WO2008061632 * | 5/2008 |

OTHER PUBLICATIONS

Lee et al., "Environmentally Friendly Synthesis of Organic-Soluble Silver Nanoparticles for Printed Electronics", Nanotechnology, 18, 2007, 335601, pp. 1-5, IOP Publishing Ltd.

Dimitrakopoulos et al., "Organic Thin Film Transistors for Large Area Electronics", Adv. Mater. 2002, 14, No. 2, Jan. 16, 2002, pp. 99-117.

Wu et al., "Printed Silver Ohmic Contacts for High-Mobility Organic Thin-Film Transistors", J. Am. Chem. Soc. 2006, 128, 4202-4203.

Lin et al., "Direct Synthesis of Narrowly Dispersed Silver Nanoparticles Using a Single-Source Precursor", Langmuir, 2003, 19, 10081-10085.

Hiramatsu et al., "A Simple Large-Scale Synthesis of Nearly Monodisperse Gold and Silver Nanoparticles with Adjustable Sizes and with Exchangeable Surfactants", Chemistry of Materials, vol. 16, o. 13, Jun. 29, 2004.

Li et al., U.S. Appl. No. 11/946,923, filed Nov. 29, 2007.
Li, Yuning, U.S. Appl. No. 12/193,203, filed Aug. 18, 2008.
Li, Yuning, U.S. Appl. No. 12/193,225, filed Aug. 18, 2008.

* cited by examiner

ORGANOAMINE STABILIZED SILVER NANOPARTICLES AND PROCESS FOR PRODUCING SAME

BACKGROUND

Disclosed herein, in various embodiments, are stable, high performing nanoparticle compositions as well as processes and devices for making and/or using the same.

Fabrication of electronic circuit elements using liquid deposition techniques may be beneficial as such techniques provide potentially low-cost alternatives to conventional mainstream amorphous silicon technologies for electronic applications such as thin film transistors (TFTs), light-emitting diodes (LEDs), RFID tags, photovoltaics, etc. However, the deposition and/or patterning of functional electrodes, pixel pads, and conductive traces, lines and tracks which meet the conductivity, processing, and cost requirements for practical applications have been a great challenge. The metal, silver (Ag), is of particular interest as conductive elements for electronic devices because silver is much lower in cost than gold (Au) and it possesses much better environmental stability than copper (Cu).

Prior lab-scale methods for producing silver nanoparticles used multiple steps and were laborious and time-consuming. The results were not reproducible or easily scaled up for large scale manufacturing. In addition, the resultant product typically manifested as a sticky paste, raising handling issues. The final product also had a short shelf life and low purity.

There is therefore a critical need, addressed by embodiments of the present disclosure, for lower cost methods for preparing liquid processable, stable silver-containing nanoparticle compositions that are suitable for fabricating electrically conductive elements of electronic devices.

BRIEF DESCRIPTION

The present application discloses, in various exempla embodiments, processes or preparing silver-containing nanoparticle compositions, as well as the compositions so produced. Devices which use the nanoparticle compositions, such as thin film transistors, are also disclosed.

Disclosed in embodiments is a process for producing organoamine-stabilized silver nanoparticles, comprising: forming a heated solution comprising an organic solvent and a first amount of organoamine; adding silver salt particles to the solution; adding a second amount of organoamine to the solution; adding an organohydrazine to the solution; and reacting the solution to form organoamine-stabilized silver nanoparticles.

The silver salt may be selected from the group consisting of silver acetate, silver nitrate, silver oxide, silver acetylacetonate, silver benzoate, silver bromate, silver bromide, silver carbonate, silver chloride, silver citrate, silver fluoride, silver iodate, silver iodide, silver lactate, silver nitrite, silver perchlorate, silver phosphate, silver sulfate, silver sulfide, and silver trifluoroacetate.

The organic solvent may be selected from the group consisting of toluene, heptane, hexane, benzene, cyclohexane, pentane, bromobenzene, chlorobenzene, and hydrocarbons.

The molar ratio of total organoamine to silver salt may be from about 1:1 to about 15:1.

The solution may be heated to a first temperature of from about 50° C. to about 80° C. The solution may be cooled after the second amount of organoamine is added. The solution may be cooled over a period of about 30 minutes or more. The solution may be cooled to a temperature of from about 45° C. to about 60° C.

The weight ratio of organic solvent to the first amount of organoamine may be about 1:1. The weight ratio of the first amount of organoamine to the second amount of organoamine may be about 1:1.

The organohydrazine may be of the formula:

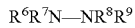

wherein $R^6$, $R^7$, $R^8$ and $R^9$ are independently selected from hydrogen, alkyl, and aryl; and wherein at least one of $R^6$, $R^7$, $R^8$ and $R^9$ may be not hydrogen.

The resulting nanoparticles may have an average diameter of from about 2 nanometers to about 8 manometer, and/or a particle size distribution of about 10 nanometers. The resulting nanoparticles may also have a silver content of 80 percent or more.

The process may further comprise: separating the silver nanoparticles from the solution by adding isopropanol and a non-solvent to the solution; and washing the silver nanoparticles.

The non-solvent may comprise acetone, methanol, ethanol, propanol, methyl ethyl ketone, acetonitrile, isobutyl alcohol, and combinations thereof. The volume ratio of isopropanol to non-solvent may be about 0.4:1.

Also disclosed in embodiments is a process for producing organoamine-stabilized silver nanoparticles, comprising: forming a solution comprising an organic solvent and a first amount of organoamine and having a first temperature; adding silver salt particles to the solution; adding a second amount of organoamine to the solution; cooling the solution down to a second temperature; adding an organohydrazine to the solution; reacting the solution to form organoamine-stabilized silver nanoparticles; cooling the solution down to a third temperature; adding isopropanol to the solution; adding a non-solvent to the solution to separate the silver nanoparticles from the solution; and washing the silver nanoparticles.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
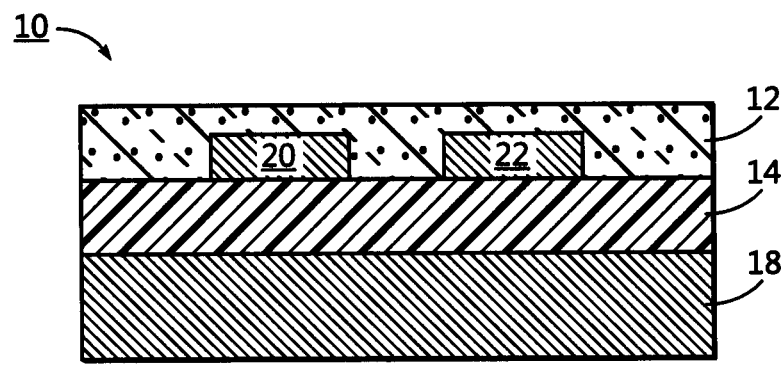
FIG. 1 represents a first embodiment of a thin film transistor containing nanoparticles of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The term "nano" as used in "silver-containing nanoparticles" indicates a particle size of less than about 1000 nm. In embodiments, the silver-containing nanoparticles have a particle size of from about 0.5 nm to about 1000 nm, from about 1 nm to about 500 nm, from about 1 nm to about 100 nm, and particularly from about 1 nm to about 20 nm. The particle size is defined herein as the average diameter of the silver-containing particles, as determined by TEM (transmission electron microscopy).

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The processes of the present disclosure produce organoamine-stabilized silver nanoparticles. The processes comprise: (a) forming a solution comprising an organic solvent and a first amount of organoamine; (b) adding silver salt particles to the solution; (c) adding a second amount of organoamine to the solution; (d) adding an organohydrazine to the solution; and (e) reacting the solution to form organoamine-stabilized silver nanoparticles.

The organic solvent may be toluene, heptane, hexane, benzene, cyclohexane, pentane, bromobenzene, chlorobenzene, and other hydrocarbons. Exemplary organic solvents include high purity isoparaffinic solvents available under the name ISOPAR®. Desirably, the first organic solvent is toluene.

The organoamine may be a primary, secondary, or tertiary amine. Exemplary organoamines include propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, N,N-dimethylamine, N,N-dipropylamine, N,N-dibutylamine, N,N-dipentylamine, N,N-dihexylamine, N,N-diheptylamine, N,N-dioctylamine, N,N-dinonylamine, N,N-didecylamine, N,N-diundecylamine, N,N-didodecylamine, methylpropylamine, ethylpropylamine, propylbutylamine, ethylbutylamine, ethylpentylamine, propylpentylamine, butylpentylamine, triethylamine, tripropylamine, tributylamine, tripentylamine, trihexylamine, triheptylamine, trioctylamine, 1,2-ethylenediamine, N,N,N',N'-tetramethylethylenediamine, propane-1,3-diamine, N,N,N',N'-tetramethylpropane-1,3-diamine, butane-1,4-diamine, and N,N,N',N'-tetramethylbutane-1,4-diamine, and the like, or mixtures thereof. In specific embodiments the silver nanoparticles are stabilized with dodecylamine, tridecylamine, tetradecylamine, pentadecylamine, or hexadecylamine.

The organoamine is added in two steps. A first amount of organoamine is present in the solution before the silver salt particles are added, and a second amount of organoamine is added to the solution after the silver salt particles are added. The weight ratio of the organic solvent to the first amount of organoamine may be about 1:1. The weight ratio of the first amount of organoamine to the second amount of organoamine may be about 1:1.

The solution comprising the organic solvent and the first amount of organoamine is at a first, elevated temperature. This first, elevated, temperature may be from about 50° C. to about 80° C. The solution is generally maintained at atmospheric pressure, and the solution may be agitated (i.e. stirred) as well. The solution should be placed under an inert atmosphere blanket (e.g. nitrogen or argon).

The silver salt particles are then added to the heated solution. Exemplary silver salts include silver acetate, silver nitrate, silver oxide, silver acetylacetonate, silver benzoate, silver bromate, silver bromide, silver carbonate, silver chloride, silver citrate, silver fluoride, silver iodate, silver iodide, silver lactate, silver nitrite, silver perchlorate, silver phosphate, silver sulfate, silver sulfide, and silver trifluoroacetate. The silver salt particles are desirably fine for homogeneous dispersion in the solution, which aids in efficient reaction. The silver salt particles can generally be added rapidly as they dissolve quickly.

The second amount of organoamine is then added to the solution. The molar ratio of the total organoamine added to the silver salt may be from about 1:1 to about 15:1. The solution may be cooled after the second amount of organoamine is added. The solution may be cooled over a period of about 30 minutes or more, such as about 45 minutes. The solution may be cooled to a lower second temperature of from about 45° C. to about 60° C. It was found that this two-step process of adding the organoamine resulted in consistently reproducible dissolution of the silver salt particles into the solution, allowing the attainment of higher quality silver nanoparticles.

Next, an organohydrazine is added to the solution. The organohydrazine has the formula:

$$R^1R^2N\text{---}NR^3R^4$$

wherein $R^1$, $R^2$, $R^3$, and $R^4$ are independently selected from hydrogen, alkyl, and aryl; and wherein at least one of $R^1$, $R^2$, $R^3$, and $R^4$ is not hydrogen. In more specific embodiments, the organohydrazine is of the formula $R^1R^2N\text{---}NH_2$. Exemplary organohydrazines include phenylhydrazine.

The solution containing silver salt particles, organoamine, and organohydrazine is then reacted to form the organoamine stabilized silver nanoparticles. The reaction can occur for a period of time ranging from about 5 minutes to about 2 hours. The solution can be mixed or stirred during this reaction as well. Generally, the solution is maintained at the second temperature during the reaction.

The resulting nanoparticles have an average diameter of 10 nanometers or less. In more specific embodiments, the nanoparticles have an average diameter of from about 1 nanometer to about 10 nanometers, including from about 2 nanometers to about 8 nanometers. In other embodiments, the nanoparticles may also have a narrow particle size distribution (i.e. the difference between the diameter of the largest nanoparticle and the diameter of the smallest nanoparticle) of about 10 nanometers.

The nanoparticles may have a silver content of 80% or more, including from 80% to about 90%. This content is higher than that produced by conventional processes.

The organoamine stabilized silver nanoparticles may then be separated from the solution. The solution can be cooled down to a third, lower temperature, such as from about 35° C.

to about 50° C. The nanoparticles are separated by precipitating the nanoparticles. The silver nanoparticles may then be washed. It was found that adding isopropanol to the solution, followed by a second non-solvent, i.e. a liquid in which the nanoparticles are not soluble, improved the shelf life and the purity of the organoamine stabilized silver nanoparticles. Exemplary second non-solvents include acetone, methanol, ethanol, propanol, methyl ethyl ketone, acetonitrile, isobutyl alcohol, other ketones and alcohols, and combinations thereof. A preferred non-solvent is methanol. Desirably, the volume ratio of isopropanol to non-solvent is about 0.4:1.

The processes of the present disclosure provide organoamine stabilized silver nanoparticles. The resulting nanoparticles are also pure, in powder form, easily dispersable, and have improved shelf life and stability. Because the nanoparticles are not in a paste form, they are not sticky, easier to handle, and disperse more homogeneously. The processes are also reproducible and scale up more consistently than prior processes.

In embodiments, the silver-containing nanoparticles are composed of elemental silver or a silver composite. Besides silver, the silver composite may include either or both of (i) one or more other metals and (ii) one or more non-metals. Suitable other metals include, for example, Al, Au, Pt, Pd, Cu, Co, Cr, In, and Ni, particularly the transition metals, for example, Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include, for example, Si, C, and Ge. The various components of the silver composite may be present in an amount ranging for example from about 0.01% to about 99.9% by weight, particularly from about 10% to about 90% by weight. In embodiments, the silver composite is a metal alloy composed of silver and one, two or more other metals, with silver comprising, for example, at least about 20% of the nanoparticles by weight, particularly greater than about 50% of the nanoparticles by weight.

In embodiments, further processing of the silver nanoparticles (with the carboxylic acid on the surface thereof) may occur such as, for example, making them compatible with a liquid deposition technique (e.g., for fabricating an electronic device). Such further processing of the composition may be, for instance, dissolving or dispersing the silver-containing nanoparticles in an appropriate liquid.

The fabrication of conductive elements from the silver nanoparticles can be carried out in embodiments using any suitable liquid deposition technique including i) printing such as screen/stencil printing, stamping, microcontact printing, ink jet printing and the like, and ii) coating such as spin-coating, dip coating, blade coating, casting, dipping, and the like. The deposited silver nanoparticles at this stage may or may not exhibit electrical conductivity.

Heating the deposited nanoparticles at a temperature of below about 300° C., preferably at or below about 250° C. causes them to coalesce to form electrically conductive layers which are suitable for use as conductive elements in electronic devices. The heating is performed for a time ranging from for example about one minute to about 10 hours, particularly from about 5 minutes to about 1 hour. The heating can be done at a temperature of from about 100° C. to about 300° C. In more specific embodiments, the heating is performed at a temperature of from about 120° C. to about 200° C., or from about 170° C. to about 190° C.

The conductivity of the resulting silver-containing elements produced by heating the deposited silver nanoparticles is, for example, at least one thousand S/cm. In other embodiments, the conductivity is at least ten thousand S/cm as measured by four-probe method.

The resulting conductive elements can be used as conductive electrodes, conductive pads, conductive lines, conductive tracks, and the like in electronic devices such as thin film transistor, organic light emitting diodes, RFID (radio frequency identification) tags, photovoltaic, and other electronic devices which require conductive elements or components.

In FIG. 1, there is schematically illustrated a thin film transistor ("TFT") configuration 10 comprised of a heavily n-doped silicon wafer 18 which acts as both a substrate and a gate electrode, a thermally grown silicon oxide insulating dielectric layer 14 on top of which are deposited two metal contacts, source electrode 20 and drain electrode 22. Over and between the metal contacts 20 and 22 is a semiconductor layer 12 as illustrated herein.

Figure 2:
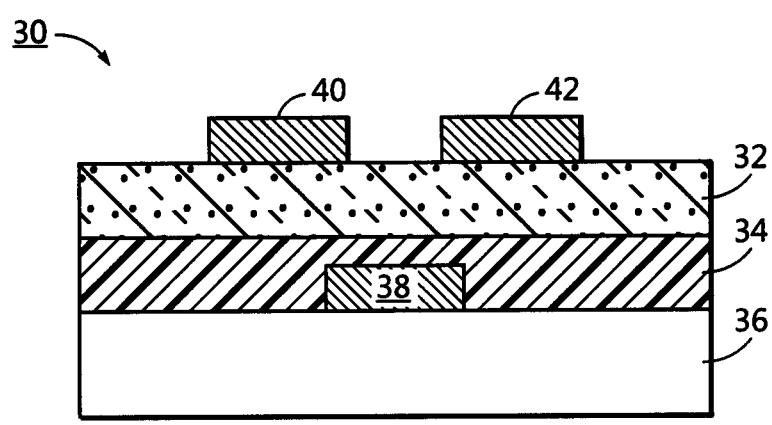
FIG. 2 represents a second embodiment of a thin film transistor containing nanoparticles of the present disclosure.

FIG. 2 schematically illustrates another TFT configuration 30 comprised of a substrate 36, a gate electrode 38, a source electrode 40 and a drain electrode 42, an insulating dielectric layer 34, and a semiconductor layer 32.

Figure 3:
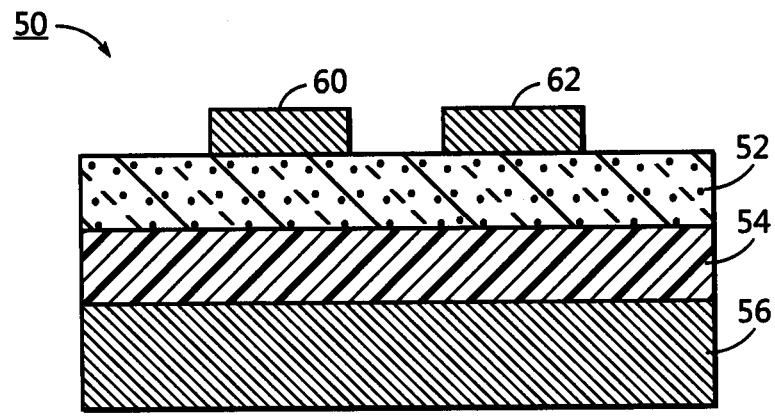
FIG. 3 represents a third embodiment of a thin film transistor containing nanoparticles of the present disclosure.

FIG. 3 schematically illustrates a further TFT configuration 50 comprised of a heavily n-doped silicon wafer 56 which acts as both a substrate and a gate electrode, a thermally grown silicon oxide insulating dielectric layer 54, and a semiconductor layer 52, on top of which are deposited a source electrode 60 and a drain electrode 62.

Figure 4:
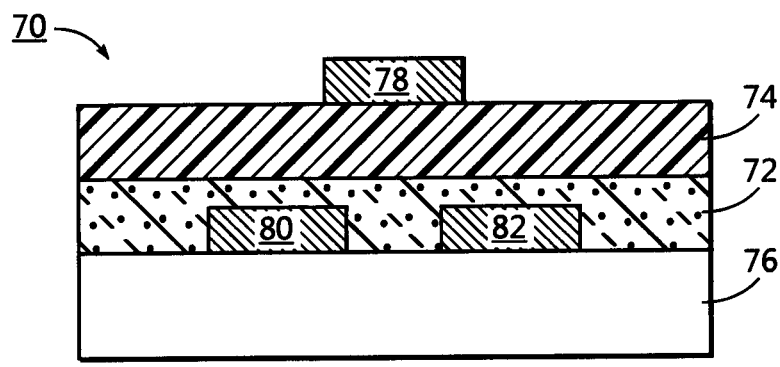
FIG. 4 represents a fourth embodiment of a thin film transistor containing nanoparticles of the present disclosure.

FIG. 4 schematically illustrates an additional TFT configuration 70 comprised of substrate 76, a gate electrode 78, a source electrode 80, a drain electrode 82, a semiconductor layer 72, and an insulating dielectric layer 74.

The substrate may be composed of, for instance, silicon, glass plate, plastic film or sheet. For structurally flexible devices, plastic substrate, such as for example polyester, polycarbonate, polyimide sheets and the like may be used. The thickness of the substrate may be from amount 10 micrometers to over 10 millimeters with an exemplary thickness being from about 50 micrometers to about 2 millimeters, especially for a flexible plastic substrate and from about 0.4 to about 10 millimeters for a rigid substrate such as glass or silicon.

The gate electrode, the source electrode, and the drain electrode are fabricated by embodiments of the present disclosure. The thickness of the gate electrode layer ranges for example from about 10 to about 2000 nm. Typical thicknesses of source and drain electrodes are, for example, from about 40 nm to about 1 micrometer with the more specific thickness being about 60 to about 400 nm.

The insulating dielectric layer generally can be an inorganic material film or an organic polymer film. Illustrative examples of inorganic materials suitable as the insulating layer include silicon oxide, silicon nitride, aluminum oxide, barium titanate, barium zirconium titanate and the like; illustrative examples of organic polymers for the insulating layer include polyesters, polycarbonates, poly(vinyl phenol), polyimides, polystyrene, poly(methacrylate)s, poly(acrylate)s, epoxy resin and the like. The thickness of the insulating layer is, for example from about 10 nm to about 500 nm depending on the dielectric constant of the dielectric material used. An exemplary thickness of the insulating layer is from about 100 nm to about 500 nm. The insulating layer may have a conductivity that is for example less than about $10^{-12}$ S/cm.

Situated, for example, between and in contact with the insulating layer and the source/drain electrodes is the semiconductor layer wherein the thickness of the semiconductor layer is generally, for example, about 10 nm to about 1 micrometer, or about 40 to about 100 nm. Any semiconductor material may be used to form this layer. Exemplary semiconductor materials include regioregular polythiophene, oligthiophene, pentacene, and the semiconductor polymers disclosed in U.S. Pat. Nos. 6,621,099; 6,770,904; and 6,949,762; and "Organic Thin Film Transistors for Large Area Electronics" by C. D. Dimitrakopoulos and P. R. L. Malenfant, *Adv. Mater.*, Vol. 12, No. 2, pp. 99-117 (2002), the disclosures of which are totally incorporated herein by reference. Any suitable technique may be used to form the semiconductor layer. One such method is to apply a vacuum of about $10^{-5}$ to $10^{-7}$ torr to a chamber containing a substrate and a source vessel that holds the compound in powdered form. Heat the vessel until the compound sublimes onto the substrate. The semiconductor layer can also generally be fabricated by solution processes such as spin coating, casting, screen printing, stamping, or jet printing of a solution or dispersion of the semiconductor.

The insulating dielectric layer, the gate electrode, the semiconductor layer, the source electrode, and the drain electrode are formed in any sequence, particularly where in embodiments the gate electrode and the semiconductor layer both contact the insulating layer, and the source electrode and the drain electrode both contact the semiconductor layer. The phrase "in any sequence" includes sequential and simultaneous formation. For example, the source electrode and the drain electrode can be formed simultaneously or sequentially. The composition, fabrication, and operation of thin film transistors are described in Bao et al., U.S. Pat. No. 6,107,117, the disclosure of which is totally incorporated herein by reference. The silver nanoparticles can be deposited as a layer upon any suitable surface, such as the substrate, the dielectric layer, or the semiconductor layer.

The following examples are for purposes of further illustrating the present disclosure. The examples are merely illustrative and are not intended to limit devices made in accordance with the disclosure to the materials, conditions, or process parameters set forth therein.

EXAMPLES

Comparative Example 1

A solution of 48.3 grams 1-hexadecylamine (200 millimoles), 3.34 grams silver acetate (20 millimoles, and 5 mL of toluene was heated at 65° C. to become a clear liquid. Phenylhydrazine diluted in toluene was then added drop-wise to the solution with vigorous stirring. The solution was stirred at 65° C. for a further 15 minutes, then methanol was added drop-wise, resulting in a black precipitate being formed. The solution was stirred for a further 10 minutes at 65° C., then cooled to 40-50° C. The precipitate was filtered off, rinsed with methanol, and vacuum oven dried for a couple of hours. A blue solid was obtained with typical silver yield of >95%.

Example 1

Synthesis of Hexadecylamine Stabilized Silver Nano-Particles at 1 L Scale

Hexadecylamine was pre-heated to 50-60° C. to melt in the original bottle. 144.6 grams of 1-hexadecylamine (600 millimoles, Aldrich, 90%) and 160 ml of toluene were heated to around 65° C. under agitation in a 1 L jacketed reactor under nitrogen blanket. 20 grams of silver acetate (120 mmoles, Alfa Aesar, 99%) was then added to the reactor over 2 minutes; the silver acetate dissolved rapidly. A second portion of hexadecylamine (144.6 grams) was poured into the reactor and the solution was cooled to 55° C. over a period of 45 minutes. 7.13 grams of phenylhydrazine (66 mmoles, Aldrich, 97%) diluted in 10 ml of toluene was added to the reactor over 10 minutes. The solution became a black-red color, indicating the reduction of silver particles and the formation of silver nanoparticles. The solution was mixed for 15 more minutes to ensure completion of the reduction reaction. The reactor was then cooled down to below 50° C. and the product was precipitated by adding 240 ml of isopropanol, followed by 560 ml of methanol to the reactor. The solution turned a dark purple-blue color. The solution was allowed to mix for 5 minutes, then discharged and transferred over to a vacuum filtration unit with a 3 inch diameter filter fitted with 0.5 μm Gortex membrane. The metallic blue cake was dispersed in 200 ml of isopropanol and washed for 30 minutes to remove any residual amines and byproducts from the reaction. The mixture was filtered using the same filter media. This was followed by three 50 ml methanol rinses to help remove isopropanol from the surface of the particles. The particles were then dried in a vacuum oven overnight at 30-40° C. The final yield of product was 15.21 grams (94.4% theoretical) containing 81% silver (estimated from TGA analysis).

Example 2

Synthesis of Hexadecylamine Stabilized Silver Nano-Particles at 6 L Scale

Hexadecylamine was pre-heated to 50-60° C. to melt in a conventional oven. 723 grams of 1-hexadecylamine (3 moles, Aldrich, 90%) and with 700 ml of toluene were heated to around 65° C. under agitation in a 6 L jacketed reactor under nitrogen blanket. 100 grams of silver acetate (0.6 moles, Alfa Aesar, 99%) was added to the reactor over 4 minutes followed by additional 100 ml of toluene. The second portion of hexadecylamine (723 grams) was charged into the reactor and the solution was cooled to 55° C. over a period of 45 minutes before reduction. 35.63 grams of phenylhydrazine (0.33 moles, Aldrich, 97%) diluted in 60 ml of toluene was added to the reactor over 20 minutes. The solution became a black-red color, indicating the reduction of silver particles. The solution was mixed for 15 more minutes to ensure completion of the reduction reaction. The reactor was then cooled down to below 50° C. and the product was precipitated by adding 1200 ml of isopropanol followed by 2800 ml of methanol. The solution turned a dark purple-blue color. The solution was allowed to mix for 15 minutes and then discharged and transferred over to a vacuum filtration unit with an 8-inch diameter filter fitted with 0.5 μm Gortex membrane. The metallic blue cake was dispersed in 1500 ml of isopropanol and was mixed for 1 hour, then was left overnight sitting in isopropanol to remove any residual amines and byproducts from the reaction. The solution was filtered using the same filter media the next morning. The cake was once again dispersed into isopropanol and washed for half an hour and was filtered using the same filtration unit. This was followed by three methanol rinses to help remove isopropanol from the product (total of 750 ml methanol). The remaining product was dried in a vacuum oven overnight at 30-40° C. The final yield of the product was 65 grams (84% theoretical) containing 84% silver (estimated from TGA analysis).

Testing and Results

The mean particle size and silver content of the silver nanoparticles of Comparative Example 1, Example, 1, and Example 2 were tested. Films were also made from these nanoparticles by deposition and annealing at 140° C. for 10 minutes. The conductivity of the films was measured. The stability of the silver nanoparticles was also assessed. The results are presented in Table 1.

| Sample | Mean Particle Size (nm) | Conductivity (S/cm) | Silver Content (%) | Stability |
|---|---|---|---|---|
| Comparative Example 1 | 4.0 | $3.529 \times 10^4$ | 75 | 10 days |
| Example 1 | 4.0 | $2.756 \times 10^4$ | 81 | 30 days |
| Example 2 | 5.0 | $2.935 \times 10^4$ | 84 | >30 days |

Figure 5:
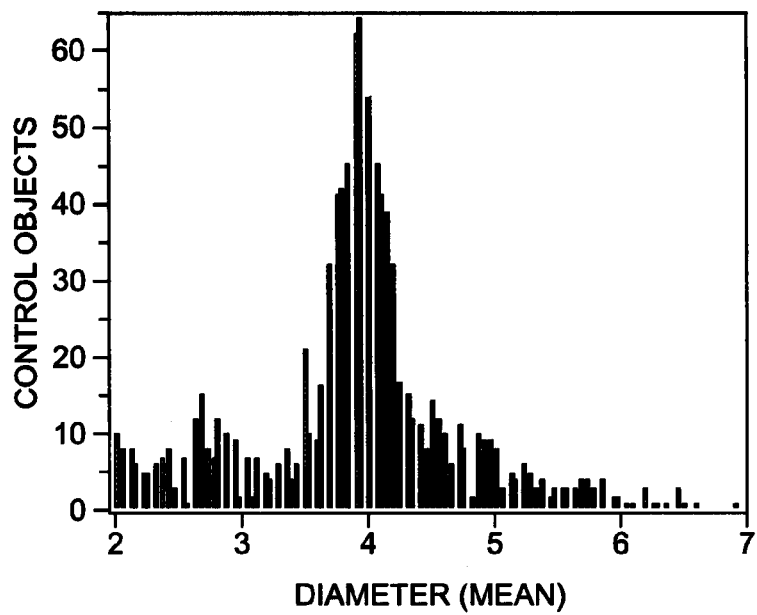
FIG. 5 is a graph showing the particle sizes and distributions of nanoparticles formed according to prior methods.
Figure 6:
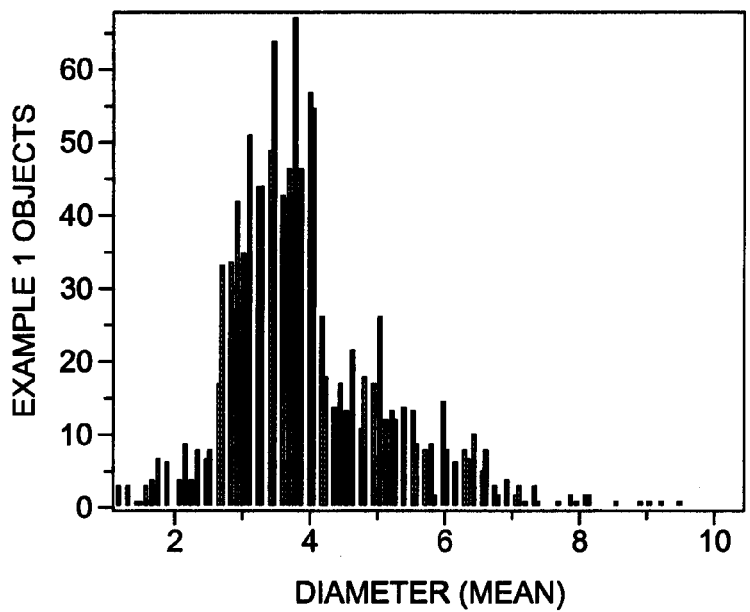
FIG. 6 is a first graph showing the particle sizes and distributions of nanoparticles formed according to the methods of the present disclosure.
Figure 7:
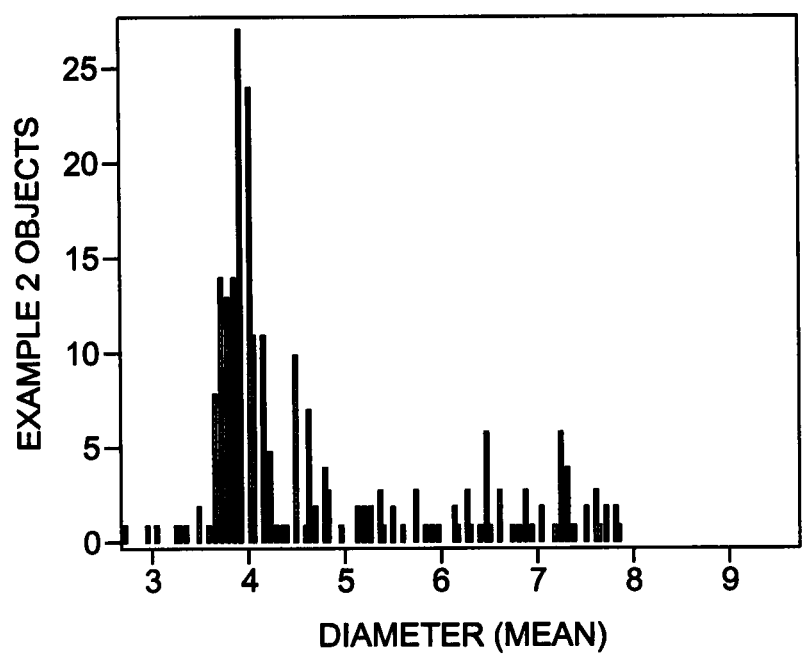
FIG. 7 is a second graph showing the particle sizes and distributions of nanoparticles formed according to the methods of the present disclosure.

FIG. 5 shows the particle size distribution of the nanoparticles formed in Comparative Example 1. FIG. 6 shows the particle size distribution of the nanoparticles formed in Example 1. FIG. 7 shows the particle size distribution of the nanoparticles formed in Example 2.

The results showed that the methods of Examples 1 and 2 produced nanoparticles that had similar conductivity, but higher silver content and higher stability (i.e. better purity and shelf life). The addition of organoamine in two steps and the use of a two-step precipitation procedure using isopropanol and a non-solvent (MeOH) both contributed to this result.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A process for producing organoamine-stabilized silver nanoparticles, comprising:
    forming a heated solution at a first temperature comprising an organic solvent and a first amount of organoamine;
    adding silver salt particles to the heated solution;
    adding a second amount of organoamine to the heated solution containing the organic solvent, first amount of organoamine, and the silver salt particles, wherein the weight ratio of the first amount of organoamine to the second amount of organoamine is about 1:1;
    cooling the heated solution to a second temperature that is lower than the first temperature;
    adding an organohydrazine to the heated solution containing the organic solvent, first amount of organoamine, silver salt particles, and the second amount of organoamine; and
    reacting the solution containing the organic solvent, first amount of organoamine, silver salt particles, second amount of organoamine, and organohydrazine to form organoamine-stabilized silver nanoparticles;
    wherein the organoamine is hexadecylamine, the silver salt is silver acetate, and the organic solvent is toluene;
    wherein the organoamine-stabilized silver nanoparticles have a silver content of 81 wt % to 84 wt %; and
    wherein when a film is made by annealing a solution containing the organoamine-stabilized silver nanoparticles and having a shelf life of 30 days or more at 140° C. for 10 minutes, the film has a conductivity of from 27560 S/cm to 29350 S/cm.

2. The process of claim 1, wherein the molar ratio of total organoamine to silver salt is from about 1:1 to about 15:1.

3. The process of claim 1, wherein the first temperature is from about 50° C. to about 80° C.

4. The process of claim 1, wherein the solution is cooled over a period of about 30 minutes or more.

5. The process of claim 1, wherein the second temperature is from about 45° C. to about 60° C.

6. The process of claim 1, wherein the weight ratio of organic solvent to the first amount of organoamine is about 1:1.

7. The process of claim 1, wherein the organohydrazine is of the formula:

$$R^6R^7N\text{---}NR^8R^9$$

wherein $R^6$, $R^7$, $R^8$ and $R^9$ are independently selected from hydrogen, alkyl, and aryl; and wherein at least one of $R^6$, $R^7$, $R^8$ and $R^9$ is not hydrogen.

8. The process of claim 1, wherein the resulting nanoparticles have an average diameter of from about 2 nanometers to about 8 nanometers.

9. The process of claim 1, wherein the resulting nanoparticles have a particle size distribution of about 10 nanometers.

10. The process of claim 1, further comprising:
    separating the silver nanoparticles from the solution by adding isopropanol and a non-solvent to the solution; and
    washing the silver nanoparticles.

11. The process of claim 10, wherein the non-solvent comprises acetone, methanol, ethanol, propanol, methyl ethyl ketone, acetonitrile, isobutyl alcohol, and combinations thereof.

12. The process of claim 10, wherein the volume ratio of isopropanol to non-solvent is about 0.4:1.

13. A process for producing organoamine-stabilized silver nanoparticles, comprising:
    forming a solution comprising an organic solvent and a first amount of organoamine and having a first temperature of from about 50° C. to about 80° C.;
    adding silver salt particles to the solution;
    adding a second amount of organoamine to the solution, wherein the weight ratio of the first amount of organoamine to the second amount of organoamine is about 1:1;
    cooling the solution containing the organic solvent, first amount of organoamine, silver salt particles, and second amount of organoamine down to a second temperature of from about 45° C. to about 60° C.;
    adding an organohydrazine to the solution;
    reacting the solution containing the organic solvent, first amount of organoamine, silver salt particles, second amount of organoamine, and organohydrazine to form organoamine-stabilized silver nanoparticles for a time period of from about 5 minutes to about 2 hours;
    cooling the solution down to a third temperature of from about 35° C. to about 50° C.;
    adding isopropanol to the solution;
    adding a non-solvent to the solution to separate the silver nanoparticles from the solution; and
    washing the silver nanoparticles;
    wherein the organoamine is hexadecylamine, the silver salt is silver acetate, and the organic solvent is toluene.

* * * * *